US006411050B1

(12) United States Patent
Yoshinari et al.

(10) Patent No.: US 6,411,050 B1
(45) Date of Patent: Jun. 25, 2002

(54) DEVICE FOR DRIVING VIBRATION ACTUATOR

(75) Inventors: Teruo Yoshinari; Minoru Ueda, both of Tokyo (JP)

(73) Assignee: Namika Precision Jewel Co., Ltd., Tokyo (JP)

( * ) Notice: Subject to any disclaimer, the term of this patent is extended or adjusted under 35 U.S.C. 154(b) by 0 days.

(21) Appl. No.: 09/555,513

(22) PCT Filed: Dec. 10, 1997

(86) PCT No.: PCT/JP97/04536

§ 371 (c)(1),
(2), (4) Date: Aug. 8, 2000

(87) PCT Pub. No.: WO99/28052

PCT Pub. Date: Jun. 10, 1999

(30) Foreign Application Priority Data

Dec. 4, 1997 (JP) .............................................. 9-349997

(51) Int. Cl.[7] .............................................. H02M 7/42
(52) U.S. Cl. .......................... 318/114; 310/19; 318/139
(58) Field of Search ................................ 318/114, 139; 310/31, 15, 17, 19

(56) References Cited

U.S. PATENT DOCUMENTS 4,481,460 A * 11/1984 Kroning et al. ............. 323/266
5,528,697 A * 6/1996 Saito .......................... 381/192
5,883,478 A * 3/1999 Thesling ..................... 318/119

FOREIGN PATENT DOCUMENTS

| | | |
|---|---|---|
| JP | 58-76157 | 5/1983 |
| JP | 63-173390 | 11/1988 |
| JP | 05-28464 | 4/1993 |
| JP | 06-225546 | 8/1994 |
| JP | 09052071 | * 2/1995 |
| JP | 07-274230 | 10/1995 |
| JP | 08-294153 | 11/1996 |
| JP | 09-52071 | 2/1997 |

* cited by examiner

*Primary Examiner*—Nicholas Ponomarenko
*Assistant Examiner*—Judson H. Jones
(74) *Attorney, Agent, or Firm*—Nixon Peabody LLP; Donald R. Studebaker

(57) ABSTRACT

In a portable device for driving a vibration actuator by means of a battery, a power supply circuit equipped with a boosting circuit for converting a voltage of a built-in battery 1 into a high voltage and a pulse generating circuit for intermittently supplying power to the vibration actuator is provided, and a boosted DC or AC voltage is impressed on the vibration actuator continuously intermittently or discontinuously.

7 Claims, 6 Drawing Sheets

DEVICE FOR DRIVING VIBRATION ACTUATOR

FIELD OF TECHNOLOGY TO WHICH INVENTION BELONGS

This invention concerns a device for driving a vibration actuator in portable electronic equipment that has a vibration actuator such as a small vibrating motor, a speaker-type vibration device or a plunger-type drive device, with a battery as the source of drive power.

PRIOR TECHNOLOGY

In the past, small pagers ("Pocket Bells") and portable telephones have had internal pager vibrators as a means of call notification in conferences, hospitals and other locations where it is inappropriate to send an audible alarm. If the vibration mode is switched on in advance, the vibrator is driven instead of an alarm being sounded when a call comes in, and the recipient is made aware of the call by means of the vibration. A small motor is generally used in such vibrators, with an eccentric weight attached to the shaft of the motor such that a vibration it generated when the battery-driven motor is caused to rotate.

In the past, small drive motors that could rotate on a low voltage were developed for this purpose, but size 3 or 4 single dry cells or rechargeable cells are generally used as pager batteries, and the voltage is 1.2 V to 1.5 V at most. For that reason, it is difficult to initiate the motor vibration and sometimes the motor does not rotate even though power is applied.

For that reason, consideration has been given to the method of using a high-voltage power supply to initiate the rotation of a low-voltage motor, and continuing to drive the motor with a low-voltage power supply once rotation is initiated. However, there is the problem that as the battery is used up, it becomes difficult to drive the rotation at the lower battery voltage, and an adequate vibration force is not available. The recent trend, especially, has required vibration motors with extremely small diameters, and as miniaturization has progressed and the inertia of the eccentric weights has been reduced, it has become easier to initiate rotation, but because of the low inertia, it has not been possible to obtain much vibration force with the low battery voltage drive.

Moreover, it is primarily small motors that have been used as vibration actuators in the past. In addition, portable electronic equipment has been expected to become smaller and lighter, and motors have been approaching the limits of miniaturization. As shown in U.S. Pat. No. 5,528,97 which does not use a small motor, consideration has been given to speaker-type vibration devices that can be used for vibration alarm, buzzer alarm or tone alarm with the vibration motor and speaker functions combined in a single device.

This sort of speaker vibration device for small, portable equipment has the problem that the low power-consumption current that is limited for the sake of portability does not provide adequate vibration for low-frequency vibration.

The purpose of this invention is to resolve the defects described above and to provide a low-power vibration actuator drive device in which the vibration is easily noticed because a continuous, intermittent or discontinuous signal is received rather than a regular signal when a call is received, and that vibrates noticeably even though it is small and thin.

PRESENTATION OF INVENTION

This invention is portable device that drives a vibration actuator by means of a battery drive, in which there is a step-up circuit that transforms the voltage of an internal battery to a high voltage, a rectifier circuit that rectifies the high voltage and charges a charging condenser, a power supply circuit that feeds the charge in the charging condenser to the vibration actuator, a switching means that alternates between the operation of charging the charging condenser and the operation of feeding the charge to the vibration condenser, and a pulse generation circuit that provides power to a vibration actuator intermittently, such that stepped up direct current or alternating current voltage is impressed on the vibration actuator with short interruptions.

Using the vibration actuator drive device of this invention, the battery which is the original source of power has a low voltage, but it is stepped up to a high voltage by the step-up circuit and stored in the charging condenser, and so by feeding pulses from the charging condenser to the vibration actuator for a short time, a small vibration motor can be driven at the same high rotation rate as a high-voltage drive even though it uses the low power of a low-voltage battery drive, and so a large vibration force can be obtained. In addition, because it is possible to drive a small vibration motor intermittently with pulse drive, it is possible to generate various modes of vibration by varying the pulse rate, and the vibration can be noticed easily.

The vibration actuator drive device of this invention is a portable device that drives a vibration actuator by means of a battery drive, in which there is a power supply circuit that has a step-up circuit that transforms the voltage of an internal battery to a high voltage and a pulse generation circuit that provides power to a vibration actuator intermittently, and in which the stepped up direct current or alternating current voltage is impressed on the vibration actuator with short interruptions.

The vibration actuator drive device of this invention is a portable device that drives a vibration actuator by means of a battery drive, in which there is a power supply circuit that has a step-up circuit that transforms the voltage of an internal battery to a high voltage and a pulse generation circuit that provides power to a vibration actuator intermittently, and in which the duty cycle of the impressed pulses is controlled so that the stepped up direct current voltage impressed on the vibration actuator with short interruptions is impressed only when the output power of the vibration actuator is at its maximum.

Using the vibration actuator drive device of this invention, the battery that is the original power source has a low voltage, but the step-up circuit steps it up to a high voltage, and so even if there is little power in the low-voltage battery drive, it is possible to drive a small vibration actuator with the same high rate of rotation as a high-voltage drive, and thus great vibration power can be obtained.

Moreover, because of the pulse drive, it is possible to drive a small vibration actuator intermittently, and so by varying the pulse interval, it is possible to generate different modes of vibration and the vibration can be noticed easily. In addition, the pulse drive reduces power consumption.

Using the vibration actuator drive device of this invention, the duty cycle of the impressed pulses is controlled so that the stepped up direct current voltage impressed on the vibration actuator with short interruptions is impressed only when the output power of the vibration actuator is at its maximum, and so maximum power can be obtained efficiently.

The vibration actuator drive device of this invention is a portable device that drives a vibration actuator by means of a battery drive, in which there is a power supply circuit that has a step-up circuit that transforms the voltage of an internal battery to a high voltage, a pulse generation circuit that outputs signals to provide power to a vibration actuator continuously, intermittently or discontinuously, and a forward/reverse rotation circuit, and in which the stepped up direct current or alternating current voltage is impressed on the vibration actuator continuously, intermittently or discontinuously.

The vibration actuator drive device of this invention has a power supply circuit that has a step-up circuit that transforms the voltage of an internal battery to a high voltage, a pulse generation circuit that outputs signals to provide power to a vibration actuator continuously, intermittently or discontinuously, and a forward/reverse rotation circuit, and is constituted so that by controlling the width of the impressed pulses and impressing signals of differing pulse widths on the forward/reverse rotation circuit, the vibration actuator cyclically generates signals of various modes.

Using the vibration actuator drive device of this invention, the battery that is the original power source has a low voltage, but the step-up circuit steps it up to a high voltage, and so even if there is little power in the low-voltage battery drive, it is possible to drive a small vibration actuator with the same high rate of rotation as a high-voltage drive, and thus great vibration power can be obtained, besides which the stepped up direct current or alternating current voltage is impressed on the vibration actuator continuously, intermittently or discontinuously so that it is possible to ring in different vibration modes and produce Morse signals by means of the vibration.

It is also possible to drive, as the vibration actuator, an actuator that requires switching such as a speaker-type vibration device or a plunger-type vibration device, instead of a small vibration motor.

Using the vibration actuator drive device of this invention, the duty cycle of the impressed pulses is controlled so that the stepped up direct current voltage impressed on the vibration actuator with short interruptions is impressed only when the output power of the vibration actuator is at its maximum, and so maximum power can be obtained efficiently.

The vibration actuator drive device of this invention is a portable device that drives a speaker-type vibration device by means of a low-frequency signal, in which there is a low-frequency oscillator circuit that feeds signals to the speaker-type vibration device continuously, intermittently or discontinuously, such that the low-frequency signals are impressed on the speaker-type vibration device continuously, intermittently or discontinuously.

The vibration actuator drive device of this invention is a portable device that drives a speaker-type vibration device with a low-frequency oscillator circuit that outputs signals to the speaker-type vibration device continuously, intermittently or discontinuously, constituted such that the width of the impressed signals is controlled and the speaker-type vibration device is caused to generate signals in various modes cyclically, by means of impressing signals of differing signal widths upon it.

Using the vibration actuator drive device of this invention, the low-frequency signals are impressed on the speaker-type vibration device continuously, intermittently or discontinuously, and so it is possible to ring in various vibration modes, such that the vibration is noticed more easily than in the case of continuous vibration, and current consumption is reduced.

Using the vibration actuator drive device of this invention, the duty cycle of the impressed signals is controlled so that they are impressed only when the output power of the speaker-type vibration device is at its maximum, and so maximum power can be obtained efficiently. Moreover, even when current consumption is the same as under conventional technology, the intermittent drive makes it possible to impress voltage higher than the rated value, and so greater vibration force is available.

OPTIMUM MODE FOR IMPLEMENTATION OF INVENTION

Figure 1:
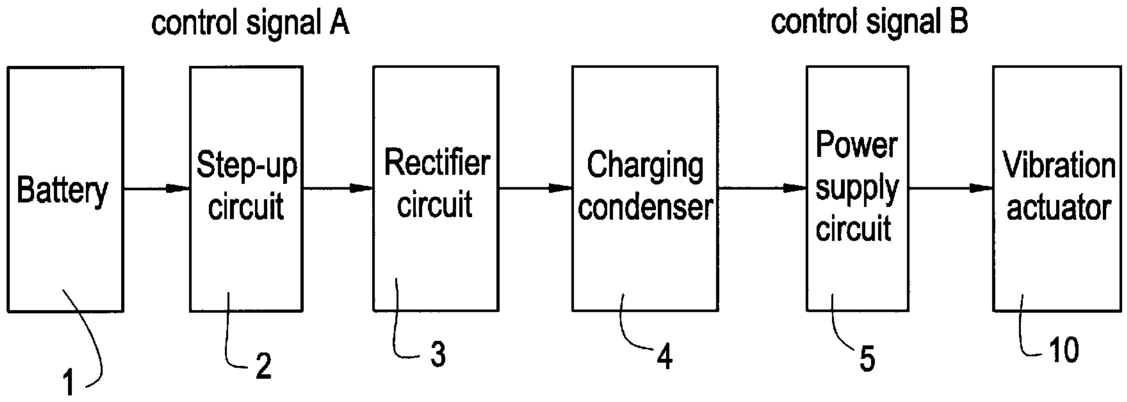
FIG. 1 is a block diagram showing one implementation of the vibration actuator drive device of this invention.

A detailed explanation of the vibration actuator drive device of this invention is given below, based on implementation 1, which is illustrated in the drawings.

Figure 2:
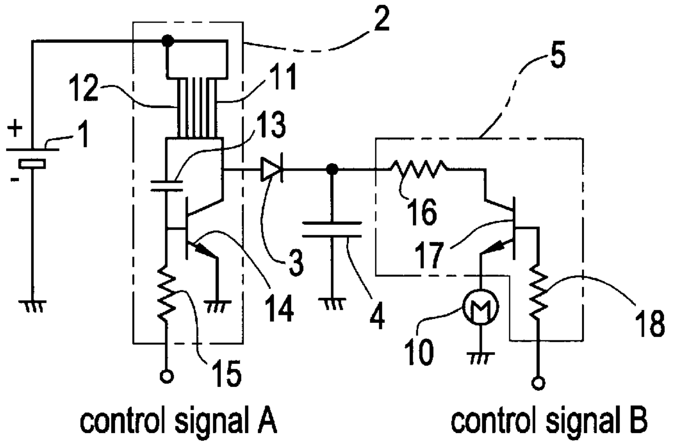
FIG. 2 is a circuit diagram showing one implementation of the vibration actuator drive device of this invention.
Figure 3:
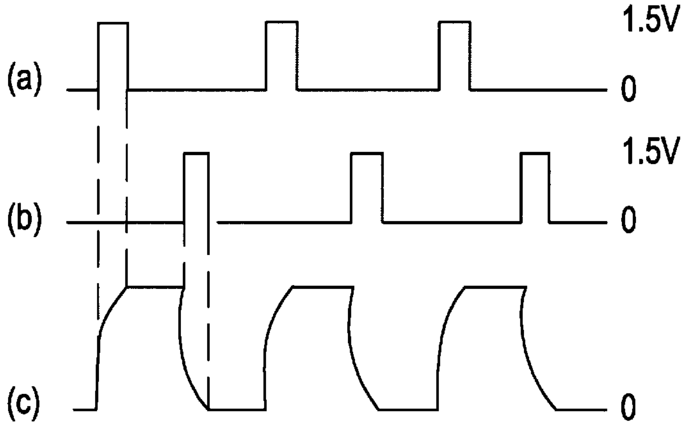
FIG. 3 is a waveform diagram showing the waveform of the control signal and the terminal voltage of the vibration actuator of the circuit in FIG. 2.

FIG. 1 is a block diagram showing one implementation of the vibration actuator drive device of this invention, and FIG. 2 is a circuit diagram, similarly showing one implementation of the vibration actuator drive device of this invention. FIG. 3 is a waveform diagram showing the waveform of the control signal and the terminal voltage of the vibration actuator of the circuit in FIG. 2.

In FIG. 1, the battery 1 supplies power to the step-up circuit 2, the operation of which is controlled by a control signal A. The step-up circuit 2 has the function of increasing the 1.5 V voltage of the battery 1 2-fold to 6-fold to a high voltage of 3 V to 9 V. The high-voltage output of the step-up circuit 2 is connected through a rectifier 3 to one side of a charging condenser 4, and also to a power supply circuit 5. The operation of the power supply circuit 5 is controlled by a control signal B.

The two control signals A and B are provided by a control signal generator that causes the step-up circuit 2 and the power supply circuit 5 to operate alternately and exclusively.

In this constitution, when the step-up circuit 2 is operated by the control signal A, a high-voltage output is produced by the step-up circuit 2, and a high-voltage charge passes through the rectifier circuit 3 to charge the charging condenser 4. When the operation of the step-up circuit 2 was stopped by the control signal A, the action of the rectifier circuit 3 does not allow the charge from the charging condenser 4 to flow back to the step-up circuit 2, and so the charging condenser 4 remains in a state of high-voltage bias.

Next, the power supply circuit 5 is operated by the control signal B, and feeds the charge stored in the charging condenser 4 to the vibration actuator 10, and the terminal voltage of the charging condenser 4 drops. When the operation of the power supply circuit 5 is stopped by the control signal B, the terminal voltage of the charging condenser 4 does not rise again until the step-up circuit 2 operates again. By operating the step-up circuit 2 and the power supply circuit 5 alternately, the terminal voltage of the vibration actuator 10 is given a direct current, rectangular waveform.

FIG. 2 is a circuit diagram showing one implementation of the vibration actuator drive device of this invention. In this circuit, the step-up circuit 2 has a transformer with two windings 11, 12, and a blocking oscillator that comprises a condenser 13, a transistor 14 and a resistor 15. The battery 1 is connected as a source of power for the blocking oscillator. The control signal A has a base bias voltage provided for the transistor 14, and when the control signal A is at a voltage level at or above about 1 volt, the blocking oscillator begins to oscillate, and a voltage pulse is sent to the collector of the transistor 14. When the voltage level of the control signal A is at a voltage level below about 0.4 volts, the blocking oscillator stops oscillating and does not generate a voltage pulse. At that time the power consumption of the step-up circuit 2 with respect to the battery 1 is approximately zero.

The high-voltage voltage pulses sent to the collector of the transistor 14 of the step-up circuit 2 are impressed on the charging condenser 4 through the rectifier circuit 3, and charge the charging condenser 4. In other words, the charging condenser 4 that is switched by the control signal A constitutes the switching means for charging the charging condenser 4. The rectifier circuit 3 is a diode, and prevents the charge stored in the charging condenser 4 from flowing back to the step-up circuit 2. Accordingly, the charge stored in the charging condenser 4 is supplied to the vibration actuator 10 only by the power supply circuit 5. This power supply circuit 5 comprises resistors 16, 18 and a transistor 17. The control signal B supplies the base input to the transistor 17, and when the voltage level of the control signal B is at or above about 1 V, the transistor 17 is conductive and supplies the charge stored in the charging condenser 4 to the vibration actuator 10 through the resistor 16. In other words, the transistor 17 that is switched by the control signal B is the switching means for supplying power to the vibration actuator 10. When the voltage level of the control signal B is below about 0.4 V, the transistor 17 becomes nonconductive. The resistor 16 is used to control the flow of current from the battery 1 through the winding 11 of the step-up circuit 2 and through the rectifier circuit 3 when the transistor 17 is conductive.

In such a circuit, in the event that control signals A and B are voltage pulse streams as shown in FIGS. 3(*a*) and (*b*), the charging condenser 4 repeats a charge/discharge cycle of charging when the control signal A is 1.5 V and discharging when the control signal B is 1.5 V, and the terminal voltage of the vibration actuator 10 is a direct current voltage pulse stream as shown in FIG. 3(*c*). By varying the frequency of this voltage pulse stream, it is possible to drive the vibration actuator 10 intermittently, and thus to generate various modes of vibration so that the vibration is easily noticed.

Moreover, because the two control signals A, B are constituted such that they function only during the time that the vibration actuator is driven during a pager call, both control signals A, B are normally at the zero voltage level, and waste of battery power is minimized. In addition, in this invention the step-up circuit is shown as a transformer and condenser, but it is also possible to use something like a D/A converter. Also, in this invention it is possible to drive, as a vibration actuator in place of a small vibration motor, an actuator that requires switching such as a speaker-type vibration device or a plunger-type vibration device, and so the invention can be applied to a wide variety of portable equipment.

Under this invention, as explained in detail in the example of implementation, the battery 1 that is the original source of power is a low-voltage battery, but because it is stepped up, to a high voltage and charges the charging condenser in step-up circuit 2, the charging condenser is supplied to the coil of the small motor 10 as a pulse drive for a short period, and so it is possible even with low power from a low-voltage battery drive to drive a small vibration motor at the same high rate of rotation as with a high-voltage drive, and so a large vibration force can be obtained. Moreover, because of the pulse drive it is possible to drive the small vibration motor intermittently, and so it is possible different modes of vibration by varying the pulse interval, and thus provide a vibration actuator drive device in which the vibration is easily noticed.

A detailed explanation of the vibration actuator drive device of this invention is given below, based on implementation 2, which is illustrated in the drawings.

Figure 4:
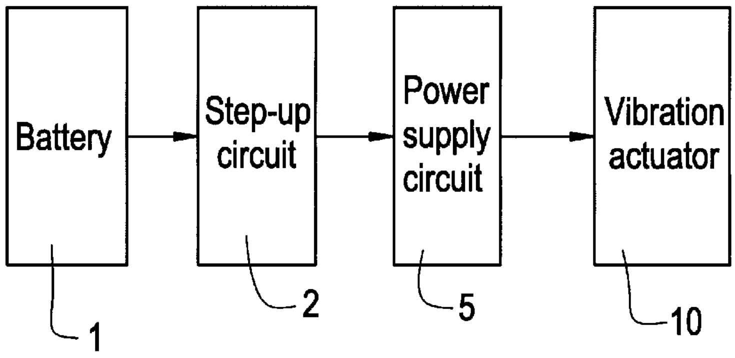
FIG. 4 is a block diagram showing one implementation of the vibration actuator drive device of this invention.
Figure 5:
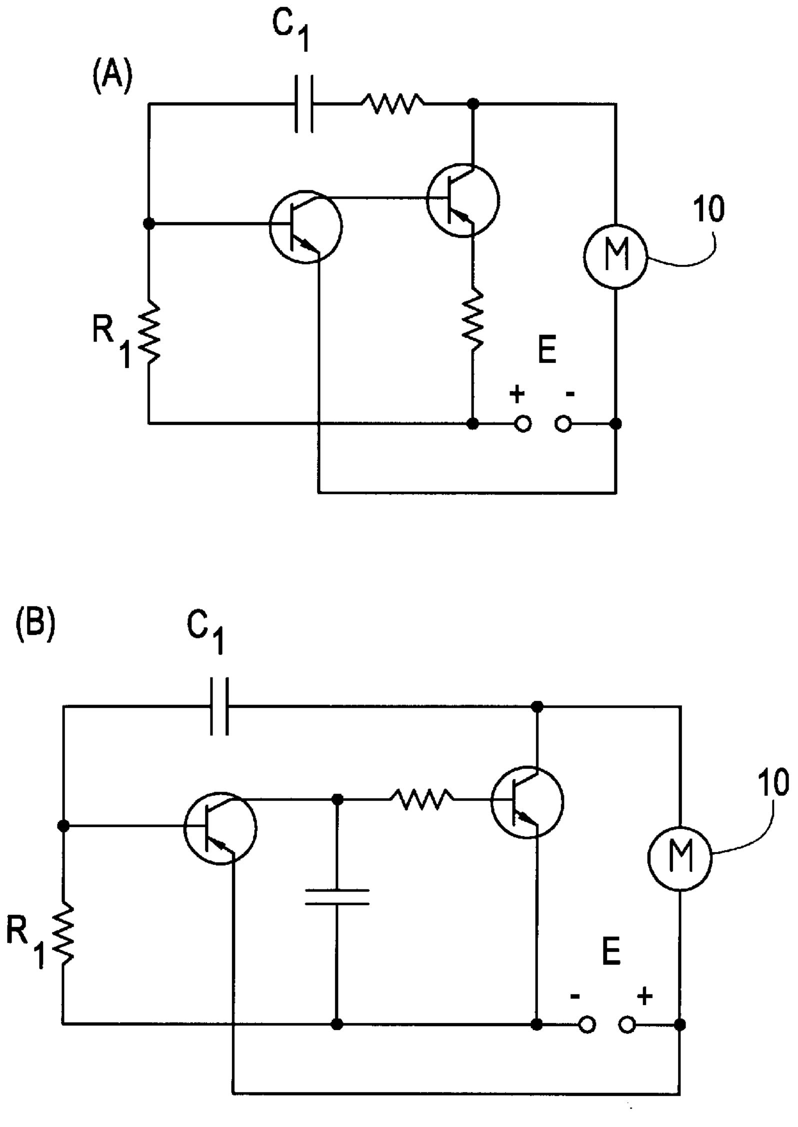
FIG. 5 is a circuit diagram showing one implementation of the vibration actuator drive device of this invention.
Figure 6:
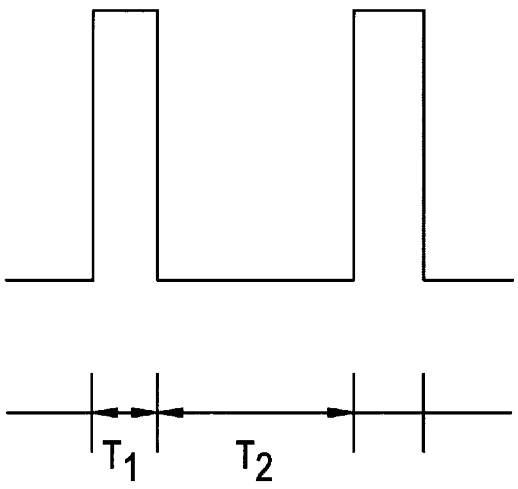
FIG. 6 is a waveform diagram showing the terminal voltage of the vibration actuator of the circuit in FIG. 5.

FIG. 4 is a block diagram showing implementation 2 of the vibration actuator drive device of this invention, and FIGS. 5(A) and (B) are circuit diagrams showing implementations of the vibration actuator drive device of this invention. FIG. 6 is a waveform diagram showing the terminal voltage of the vibration actuator of the circuit in FIG. 5.

In FIG. 4, the battery 1 mounted in portable equipment is connected to a step-up circuit 2 that converts its voltage to a high voltage. In this case, the step-up circuit 2 has the function of increasing the voltage of the battery 1 two-fold to six-fold, for example, from 1.5 V to between 3 V and 9 V. The high-voltage output of the step-up circuit 2 is connected to the power supply circuit 5, and this power supply circuit 5 intermittently drives the vibration actuator 10.

FIG. 5 is a circuit diagram that shows specific implementations of the vibration actuator drive device. FIGS. 5(A) and (B) are reactive low-frequency oscillator circuits that incorporate two different transistors, the PNP type and the NPN type. In these circuits, if the output voltage of the step-up circuit 2 is connected to E, the vibration actuator 10 is driven intermittently, and the terminal voltage of the vibration actuator is a direct current rectangular waveform.

FIG. 6 is a waveform diagram of the terminal voltage of the vibration actuator. The intervals T1 and T2 can be set by varying the values of the resistor R1 and the condenser C1 in FIGS. 5(A) and (B). And so, by varying the duty cycle of T1 and T2, it is possible to change the vibration mode of the vibration actuator.

Figure 7:
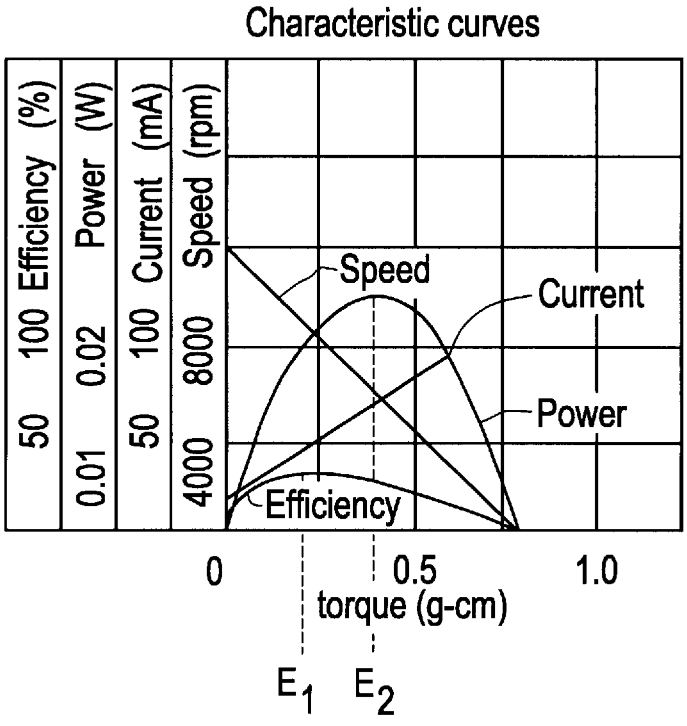
FIG. 7 is a motor characteristics graph using a small vibration motor as the drive actuator.

The second implementation 2 of the vibration actuator drive device of this invention is explained next. FIG. 7 is one example of a motor characteristics graph using a small vibration motor as the drive actuator. In the case of a conventional motor with little load, it is possible to constitute a low-power motor by designing for point E1 in FIG. 7 where efficiency is good, but it is possible to generate maximum vibration force and the best efficiency by designing for point E2 where output power is greatest, in order to make the vibration noticeable as in the case of a vibration actuator.

In this invention, the load and conduction time are calculated to generate the maximum vibration force, the duty cycle T1/T2 of the impressed pulse is adjusted to drive at the point E2 in FIG. 7, and the stepped up direct current voltage is impressed on the vibration motor discontinuously, that is, only when the output power of the vibration motor is at the maximum. Therefore, it is possible to obtain the maximum vibration force with good efficiency.

As the vibration actuator of this invention it is possible to drive, in place of the small vibration motor, actuators that require switching such as speaker-type vibration devices or plunger-type vibration devices, and so it is possible to apply it in a wide variety of portable equipment. In addition, if the internal battery is a high-voltage battery such as a lithium cell, it is possible to eliminate the step-up circuit. Even in this case, power-consumption can be reduced by means of intermittent drive.

A detailed explanation of the vibration actuator drive device of this invention is given below, based on implementation 3, which is illustrated in the drawings.

Figure 8:
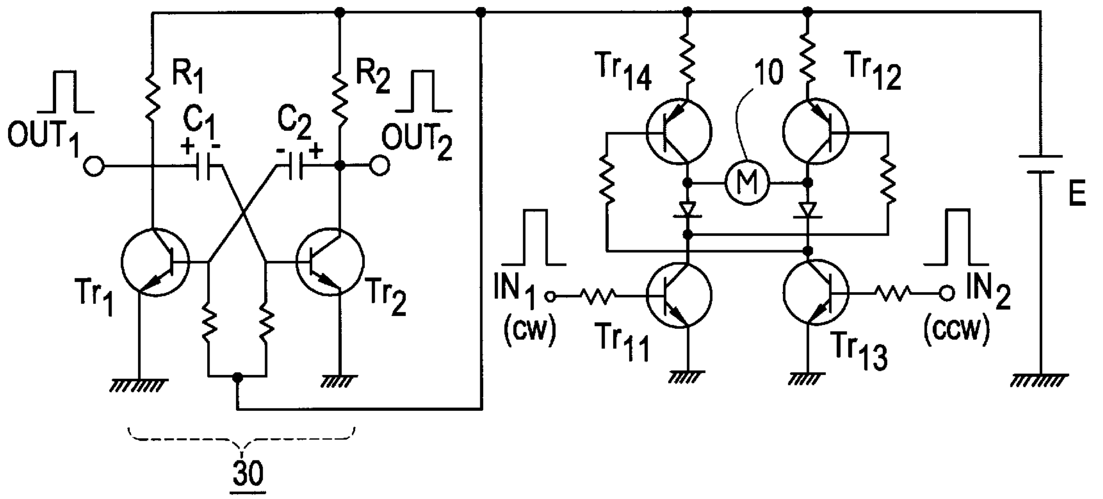
FIG. 8 is a circuit diagram showing one implementation of the vibration actuator drive device of this invention.
Figure 9:
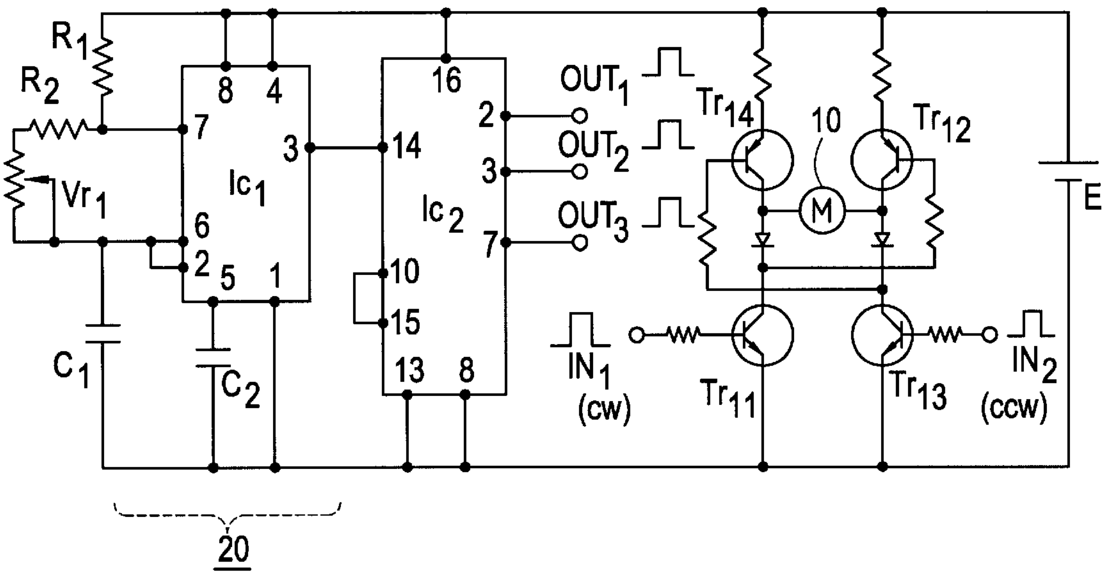
FIG. 9 is a circuit diagram showing one implementation of the vibration actuator drive device of this invention.
Figure 10:
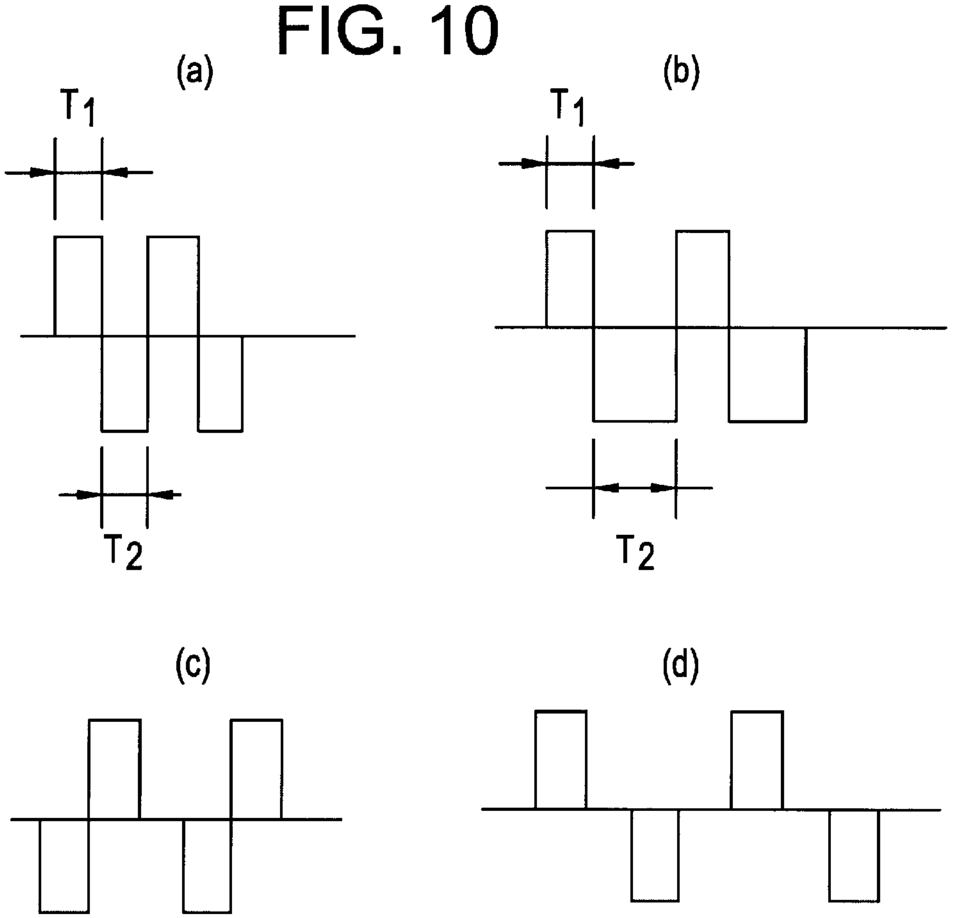
FIG. 10 is a waveform diagram showing the terminal voltages of the vibration actuators of the circuits in FIGS. 8 and 9.

FIG. 4 is a block diagram showing one implementation of the vibration actuator drive device of this invention, and FIGS. 8 and 9 are similarly circuit diagrams showing implementations of the vibration actuator drive device of this invention. FIG. 10 is a waveform diagram showing the terminal voltages of the vibration actuators of the circuits in FIGS. 8 and 9.

In FIG. 4, the battery 1 mounted in portable equipment is connected to a step-up circuit 2 that converts its voltage to a high voltage. In this case, the step-up circuit 2 has the function of increasing the voltage of the battery 1 two-fold to six-fold, for example, from 1.5 V to between 3 V and 9 V. The high-voltage output of the step-up circuit 2 is connected to the power supply circuit 5, and this power supply circuit 5 drives the vibration actuator 10 with continuous, intermittent or discontinuous pulses.

FIG. 8 is a circuit diagram showing one implementation of the vibration actuator drive device of this invention. In this circuit, if the output voltage of the step-up circuit 2 is connected to E, the vibration actuator 10 vibrates with forward/reverse continuous rotation, and the terminal voltage of the vibration actuator is a direct current rectangular waveform. FIG. 9 is a circuit diagram that drives intermittent or discontinuous forward/reverse rotation.

To explain these circuits, in FIG. 8 the oscillator circuit 30 is a transistorized multi-vibrator; the pair of resistors Tr1, Tr2 alternately charge and discharge the condensers C1, C2 connected to their respective bases, and oscillate by repetition of alternating ON and OFF operations. Their alternating output pulse signals OUT1, OUT2 are connected to the forward/reverse rotation circuits IN1, IN2. When there is no input signal, the drive transistor is OFF, and so the motor 10 is not driven, but when the ON signal is applied to the transistor Tr11 or Tr13, a forward rotation or reverse rotation action begins.

In FIG. 9, a cyclical pulse signal is produced by the timer circuit 20 which is a standard pulse generator using Ic1 (555), and the regular pulse signals output from output pin 3 are fed to the counter pin 14 of the Ic2 (4017B) and counted. When the fourth pulse enters the counter, the circuit performs a compulsory reset (the Ic2 pin 10 <counter output 4> is connected to the Ic2 pin 15 (counter reset <clear> input)), and so the output of the Ic2 becomes 0, and the counter output from the fifth pulse is another 1. Thus the counter output repeats the sequence 1-2-3-0. The counted signals are output from Ic2 pins 2 and 3, having passed through a decoded circuit, or pins 2 and 7 as output signals and are connected to the forward/reverse rotation circuit.

FIG. 10 is a waveform diagram of the terminal voltage of the vibration actuator. The terminal voltage waveforms of the circuit in FIG. 8 are the waveforms in FIGS. 10(*a*) and (*b*). The pulse intervals T1, T2 can be set by varying the values of the condensers C1, C2 and the values of the resistors R1, R2. Therefore, the vibration mode of the vibration actuator can be varied by adjusting the amplitudes of T1 and T2.

The terminal voltage waveforms of the circuit in FIG. 9 are the waveforms in FIGS. 10(*c*) and (*d*). If output terminals 2 and 3 of the Ic2 are connected to IN1 and IN2 of the forward/reverse rotation circuit, the waveform is that in FIG. 10(*c*); if output terminals 2 and 7 are connected, the waveform is that in FIG. 10(*d*). The pulse width can be set by varying the values of R1, R2, Vr and C1.

As explained above, in the vibration actuator drive device of this invention, the battery 1 that is the original source of power is a low-voltage battery, but the voltage is stepped up to a high voltage by the step-up circuit 2, an so it is possible to drive a small vibration actuator at the same high rate of rotation as with high-voltage drive even using low power from a low-voltage battery drive. Therefore, it is possible to obtain a large vibration force and, since the direct current is impressed on the vibration actuator 10 as continuous, intermittent or discontinuous pulses, to produce rings in various vibration modes and Morse signals by means of the vibration.

The second implementation 3 of the vibration actuator drive device of this invention is explained next. FIG. 7 is one example of a motor characteristics graph using a small vibration motor as the drive actuator. In the case of a conventional motor with little load, it is possible to constitute a low-power motor by designing for point E1 in FIG. 7 where efficiency is good, but it is possible to generate maximum vibration force and the best efficiency by designing for point E2 where output power is greatest, in order to make the vibration noticeable as in the case of a vibration actuator.

In this invention, the load and conduction time are calculated to generate the maximum vibration force, the duty cycle T1/T2 of the impressed pulse is adjusted to drive at the point E2 in FIG. 7, and the stepped up direct current voltage is impressed on the vibration motor discontinuously, that is, only when the output power of the vibration motor is at the maximum. Therefore, it is possible to obtain the maximum vibration force with good efficiency.

As the vibration actuator of this invention it is possible to drive, in place of the small vibration motor, actuators that require switching such as speaker-type vibration devices or plunger-type vibration devices, and so it is possible to apply it in a wide variety of portable equipment. In addition, if the internal battery is a high-voltage battery such as a lithium cell, it is possible to eliminate the step-up circuit. Even in this case, power consumption can be reduced by means of intermittent drive.

A detailed explanation of the vibration actuator drive device of this invention is given below, based on implementation 4, which is illustrated in the drawings.

Figure 11:
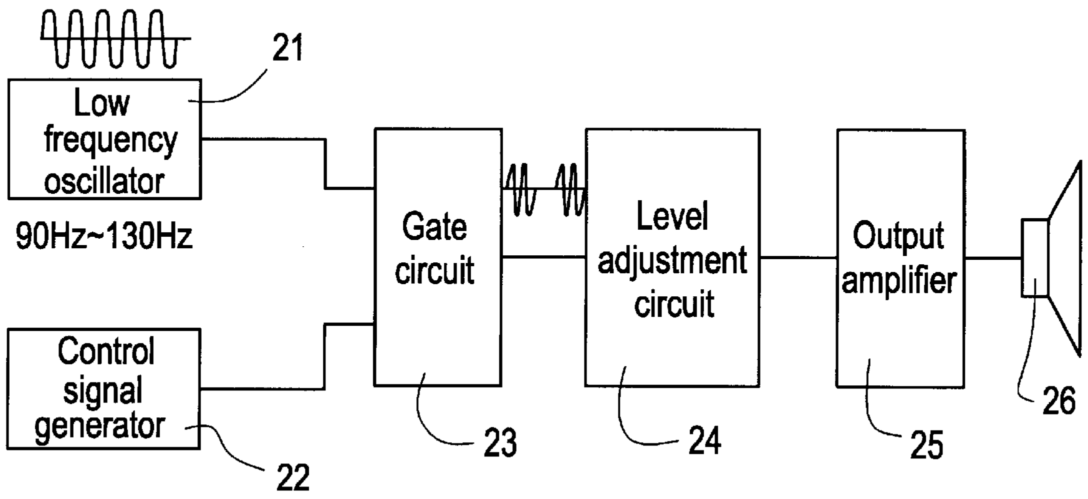
FIG. 11 is a block diagram showing one implementation of a drive device using a speaker-type vibration device as the vibration actuator drive device of this invention.
Figure 12:
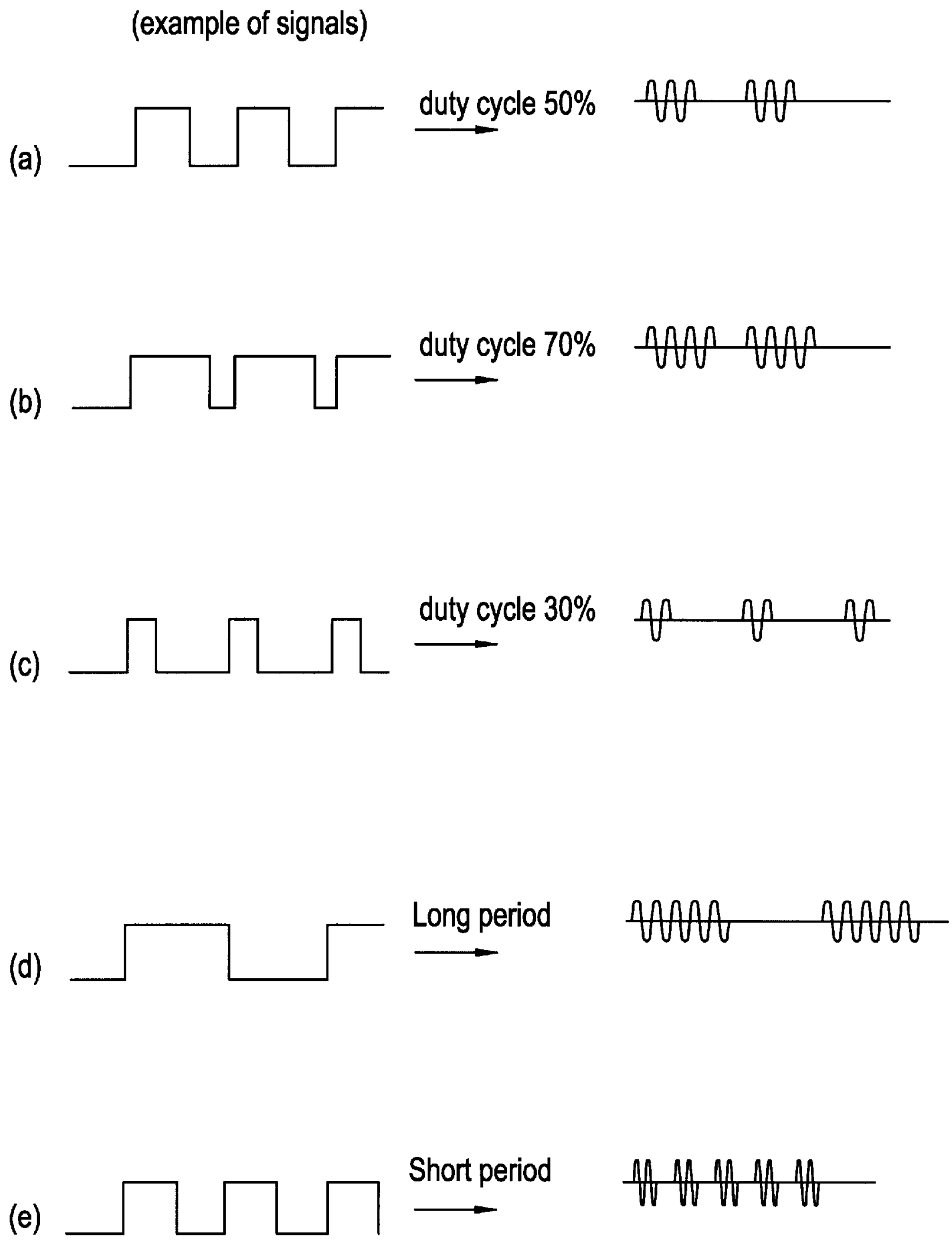
FIG. 12 is a waveform diagram showing the terminal voltage of the speaker-type vibration device in the drive device of the vibration actuator of this invention.

FIG. 11 is a block diagram showing implementation 4 of the vibration actuator drive device of this invention. FIG. 12 is a waveform diagram showing the terminal voltage of the speaker-type vibration device in the drive device of the vibration actuator of this invention.

In FIG. 11, 21 is a low frequency oscillator, and is variable from 90 Hz to 130 Hz so that the maximum amplitude is available to the speaker-type vibration device. 22 is a control signal generator, and generates the signals that turn the vibration of the speaker-type vibration device ON or OFF. 23 is a gate circuit, and is a circuit that outputs a low-frequency signal only when the control signal is at the level "H." 24 is the level adjustment circuit, and is the circuit that adjusts the amplitude of the speaker-type vibration device. 25 is the output amplifier, and is an amplifier circuit that drives the speaker-type vibration device 26 (which has an internal impedance of 4Ω to 32Ω).

In the vibration actuator drive device of implementation 4 of this invention, the low-frequency oscillator circuit 21 and the speaker-type vibration device 26 are powered by continuous, intermittent or discontinuous signals from the control signal generator 22, the gate circuit 23 that outputs low-frequency signals only when the control signal is at the level "H," the level adjustment circuit that adjusts the amplitude of the signals, and the output amplifier 25 that drives the speaker-type vibration device 26. The low-frequency signals are impressed on the speaker-type vibration device 26 continuously, intermittently or discontinuously or cyclically so as to produce various modes.

As a result of the above, even if the low-frequency oscillator circuit output is slight, the signal is amplified by the level adjustment circuit 24 and the output amplifier 25, and so the speaker-type vibration device 26 can produce a large vibration force. And because the low-frequency signal is impressed on the speaker-type vibration device 26 continuously, intermittently or discontinuously, rings are possible in various vibration modes as shown in FIG. 12, and the vibration can be noticed easily with a lower current consumption than in the case of continuous vibration.

Moreover, the duty cycle of the impressed signal is adjusted so that it is impressed discontinuously, only when the output power of the speaker-type vibration device is at its maximum, and so the maximum vibration force can be produced with good efficiency.

Also, a large vibration force was not available in speaker-type vibration devices in conventional portable devices because, to lengthen battery life, only a voltage of 1.5 V could be impressed on the drive source of vibration actuator. But by means of intermittent drive, a duty cycle of 50 makes it possible to impress 3 V and double the vibration force with the same power consumption.

Potential for Industrial Use

This invention can be applied to vibration actuator drive device in portable electronic equipment having small vibration motor, speaker-type vibration device, plunger-type vibration device or other vibration actuator with a battery as the drive source.

In particular, it can be applied as the drive method for a speaker-type vibration device that can output vibration, a buzzer or a tone from a single device, with a low-frequency signal as the drive source.

What is claimed is:

1. A portable device that drives a vibration actuator by means of a battery drive, in which there is a step-up circuit that transforms the voltage of an internal battery to a high voltage, a rectifier circuit that rectifies the high voltage and charges a charging condenser, a power supply circuit that feeds the charge stored in the charging condenser to the vibration actuator, and a switching means that alternates between the operation of charging the charging condenser and the operation of feeding the charge to the vibration actuator, and in which the stepped up direct current or alternating current voltage is impressed on the vibration actuator discontinuously for a short period.

2. A portable device that drives a vibration actuator by means of a battery drive, in which there is a step-up circuit that transforms the voltage of an internal battery to a high voltage, a rectifier circuit that recitifies the high voltage and charges a charging condenser, a power supply circuit that feeds the charge stored in the charging condenser to the vibration actuator, and a switching means that alternates between the operation of charging the charging condenser and the operation of feeding the charge to the vibration actuator, a pulse oscillator that intermittently feeds the vibration actuator, and in which the stepped up direct current or alternating current voltage is impressed on the vibration actuator discontinuously for a short period.

3. A portable device that drives a vibration actuator by means of a battery drive as described in claim 2 above, in which the duty cycle of the impressed pulse is adjusted such that the direct current voltage is impressed discontinuously on the vibration actuator only when the output power of the vibration actuator is at the maximum level.

4. A portable device that drives a vibration actuator by means of a battery drive, in which there is a step-up circuit that transforms the voltage of an internal battery to a high voltage, a rectifier circuit that rectifies the high voltage and charges a charging condenser, a power supply circuit that feeds the charge stored in the charging condenser to the vibration actuator, and a switching means that alternates between the operation of charging the charging condenser and the operation of feeding the charge to the vibration actuator, a pulse oscillator circuit that outputs pulses that continuously, intermittently or discontinuously perform the operation of feeding power to the vibration actuator, and a forward/reverse rotation circuit, and in which the stepped up direct current or alternating current voltage is impressed on the vibration actuator as continuous, intermittent or discontinuous pulses.

5. A portable device that drives a vibration actuator by means of a battery drive as described in claim 4 above, in which the width of impressed pulses is adjusted and signals with different pulse widths are impressed on the forward/reverse rotation circuit such that the vibration actuator cyclically produces various modes of signals.

6. A portable device that drives a speaker-type vibration device by means of low-frequency signals, in which there is a set-up circuit that transforms the voltage of an internal battery to a high voltage, a rectifier circuit that rectifies the high voltage and charges a charging condenser, a power supply circuit that feeds the charge stored in the charging condenser to the speaker-type vibration device, and a switching means that alternates between the operation of charging the charging condenser and the operation of feeding the charge to the speaker-type vibration device, a low-frequency oscillator circuit that outputs signals that continuously, intermittently or discontinuously perform the operation of feeding power to the speaker-type vibration device, and in which low-frequency signals are impressed continuously, intermittently or discontinuously on the speaker-type vibration device.

7. A portable device that drives a speaker-type vibration device by means of low-frequency signals as described in claim 6 above, in which the width of impressed pulses is adjusted and signals with different pulse widths are impressed such that the speaker-type vibration device cyclically produces various modes of signals.

* * * * *